United States Patent [19]

O'Brien

[11] Patent Number: 5,212,205

[45] Date of Patent: May 18, 1993

[54] REGENERATION OF DEEP BED CONDENSATE POLISHERS

[75] Inventor: Michael J. O'Brien, Basking Ridge, N.J.

[73] Assignee: The Graver Company, Union, N.J.

[21] Appl. No.: 830,616

[22] Filed: Feb. 4, 1992

[51] Int. Cl.$^5$ .............................................. B01J 49/00
[52] U.S. Cl. ..................... 521/26; 210/278; 210/675; 210/676; 210/678
[58] Field of Search .................. 521/26; 210/675, 676, 210/678, 278

[56] References Cited

U.S. PATENT DOCUMENTS

| | | | |
|---|---|---|---|
| 2,666,741 | 1/1954 | McMullen | 210/24 |
| 3,385,787 | 5/1968 | Crits et al. | 210/32 |
| 3,429,807 | 2/1969 | Burgess | 210/25 |
| 3,582,504 | 6/1971 | Salem et al. | 210/2.1 |
| 3,634,229 | 1/1972 | Stanley, Jr. | 210/33 |
| 3,826,761 | 7/1974 | Short | 260/2.1 |
| 4,120,786 | 10/1978 | Petersen et al. | 209/454 |
| 4,191,644 | 3/1980 | Lambo et al. | 210/33 |
| 4,298,696 | 11/1981 | Emmett | 521/26 |
| 4,388,417 | 6/1983 | Down | 521/26 |

Primary Examiner—Joseph L. Schofer
Assistant Examiner—Fred Zitomer
Attorney, Agent, or Firm—Dressler, Goldsmith, Shore, Sutker & Milnamow, Ltd.

[57] ABSTRACT

A method for regenerating the exhausted anion and cation exchange resin in a mixed bed demineralizer which utilizes an interface tank to increase the volume of interface resin that is physically isolated to increase separation efficiencies. An anticipatory interface detection sample flow of cation resin is directed from an intermediate section of the separation vessel through a sample line into the interface tank simultaneously with the transfer of cation resin from the bottom of the separation vessel into a cation regeneration vessel. Upon detection of an interface by the entry of anion resin, or inert material if present, into the sample line, the transfer of cation resin into the cation regeneration tank is terminated. The remaining cation resin from the separation vessel is transferred into the interface tank until an interface is detected by the entry of anion resin, or inert material if present, into the cation transfer line. Upon regeneration of the anion resin and cation, the anion resin is transferred to the cation regeneration vessel and the material in the interface tank is transferred back into the separation vessel.

13 Claims, 1 Drawing Sheet

REGENERATION OF DEEP BED CONDENSATE POLISHERS

BACKGROUND OF THE INVENTION

The present invention relates to an improved method for regenerating the exhausted anion and cation exchange resins in a mixed bed demineralizer.

Mixed bed systems containing anion and cation exchange resins for the purification of water have many industrial applications. A primary application of such a system is in the purification of water for condensate recirculation systems used to drive steam turbines. It is essential that this water be of an extremely high purity level in order to avoid any adverse effects on the surfaces of turbine blades, boilers, pipes, etc. Since it is desired to produce water that is free of any residue upon evaporation, the cation exchange resin must be in the hydrogen or ammonium form, and the anion exchange resin must be in the hydroxide form. In any event, it is conventional to regenerate the cation exchange resin with a strong acid such as sulfuric or hydrochloric acid, and to regenerate the anion exchange resin with a strong base, generally sodium hydroxide.

It has heretofore been recognized that the in-situ regeneration of anion and cation exchange resins in the service vessel is not practical. Therefore, it is necessary to transfer the resins from the service vessel to a specially designed regeneration system. There are various designs of external regeneration systems currently in use. One design regenerates both the cation and anion exchange resins in a single vessel. This type of system presents critical design problems to prevent the sodium hydroxide from contacting the cation resin and the sulfuric acid from contacting the anion exchange resin. Because of this design problem and certain operational problems the single vessel regeneration system has not found wide acceptance.

Another design is a two vessel regeneration system in which the anion and cation resins are transferred into a separation/cation regeneration vessel. The resins are backwashed with water to expand the bed and classify the resins into an upper anion exchange resin layer and a lower cation exchange resin layer. The anion resin is then removed to an anion regeneration vessel where it is cleaned and regenerated. The cation resin is cleaned and regenerated in the separation/cation regeneration vessel. This design requires the complete separation of the anion exchange resin and the cation exchange resin. Various techniques have been used to effect such separation, including those disclosed in U.S. Pat. No. 3,385,787 to Crits et al., U.S. Pat. No. 3,429,807 to Burgess, U.S. Pat. No. 3,582,504 to Salem et al., U.S. Pat. No. 3,634,229 to Stanley, Jr., U.S. Pat. No. 3,826,761 to Short and U.S. Pat. No. 4,120,786 to Petersen et al. Although the above techniques have improved the degree of separation of the anion resin and the cation resin, they have not achieved complete separation. In practice, the consequence of imperfect separation is that a small proportion of the cation resin is inevitably saturated by the anion resin regenerant and conversely a small proportion of the anion resin is saturated by the cation resin regenerant. Both of which reduces the level of performance when the resins are returned to service.

In an effort to reduce the mixing of the anion resin and the cation resin at the interface between the resins after the backwash separation, it has been suggested to provide an intermediate layer of inert resin material of specific density intermediate the specific densities of the anion and cation resins. One example of such a system is disclosed in U.S. Pat. No. 2,666,741 to McMullen. The system disclosed in this patent hydraulically separates the resins in the service vessel into an upper anion resin layer, an intermediate inert resin layer and a lower cation resin layer. The anion resin and the cation resin are regenerated by passing sodium hydroxide regenerant into the inert layer and upwardly through the anion resin and passing acid regenerant into the inert layer and downwardly through the cation resin. Although this system provides advantages over other systems which regenerate in the service vessel, it has not solved many of the problems inherent in the regeneration of the anion resin and the cation resin in the service vessel. The inert resin in the service vessel occupies space which can otherwise be occupied by additional anion and cation ion exchange resin. Accordingly, it is necessary to increase the size of the service vessel to make space for the inert resin.

The use of an intermediate density inert resin has also been heretofore disclosed in a two vessel regeneration system. Such a system is disclosed in U.S. Pat. No. 4,298,696 to Emmett. This system includes a separation/anion regeneration vessel and a cation regeneration vessel. The inert resin is mixed with the anion and cation resin in the service vessel. The resin from the service vessel is transferred into the separation/anion regeneration vessel wherein it is separated into an upper anion resin layer, an intermediate inert resin layer, and a lower cation resin layer. The cation resin layer is then hydraulically transferred to the cation regeneration vessel, leaving behind the anion resin and most of the inert resin. A conductivity sensor is used to determine the transition between the resins by detecting a decrease in the conductivity of the slurry as it passes out of the separation vessel. The anion resin is regenerated and rinsed in the separation/anion regeneration vessel and the cation resin is regenerated and rinsed in the cation regeneration vessel. The cation resin is then transferred back to the separation/anion regeneration vessel, wherein it is mixed with the anion resin and the inert resin and transferred back to a service vessel. This system also transfers the inert resin along with the anion and cation resin back into the service vessel and, thus, either results in reduced service capacity or requires an increase in the size of the service vessel. It should also be noted that the resin from each service vessel must include a quantity of inert resin. This system contemplates removal of any cation fines (heel) which are not separated out and transferred with the cation resin by the additional step of floating the anion resin in a saturated brine solution and removing the cation heel from the bottom of the separation/anion regeneration vessel.

In U.S. Pat. No. 4,388,417 to Down et al. a system is disclosed wherein the exhausted anion and cation resins from the service vessel is transferred to a separation/anion regeneration vessel which contains a quantity of inert resin of a specific density intermediate to the specific densities of the anion and cation resins. Following a sequence of wash, drain, and air scrub steps, the resins are backwashed from a bottom distributor to classify the resins into an upper anion resin layer, an intermediate inert resin layer, and a lower cation resin layer. The cation resin layer is then transferred from the bottom of the separation/anion regeneration vessel into a cation regeneration vessel. Upon completion of the cation resin transfer, the separation/anion regeneration vessel is drained and caustic soda of a concentration in the range of 10–18% is cycled therethrough, causing the anion resin to float and any traces of cation resin and the inert material to sink to the bottom of the vessel, leaving a layer of caustic soda in between. The floating anion resin is then transferred from the separation/anion regeneration vessel to an anion rinse vessel wherein it is suitably rinsed and held. The inert resin and the cation heel are obtained in the separation/anion regeneration vessel awaiting the delivery of the next exhausted resin charge. The cation resin in the cation regeneration vessel is regenerated with sulfuric acid and rinsed in a conventional manner. The anion resin is then transferred from the anion rinse vessel to the cation regeneration vessel wherein it is air mixed with the cation resin and final rinsed, whereupon the mixed anion and cation resin is held awaiting transfer to a service vessel.

In U.S. Pat. No. 4,191,644 to Lembo et al. there is disclosed a system wherein the exhausted anion and cation resins are transferred to a separation vessel wherein they are stratified into an upper floating anion resin bed and a lower floating cation resin bed. The major portion of the upper floating bed is transferred to a separate vessel for regeneration with a suitable base. A second cut is then removed from the separation vessel, which cut encompasses the interface between the upper and lower beds. This second cut contains the remainder of the anion resin not removed as well as a small amount of cation resin. The second cut is transferred to another vessel wherein it is physically separated into cation and anion portions. The remainder of the stratified resin in the separation vessel consists of cation resin which is regenerated with a suitable acid either in the separation vessel or another vessel. After regeneration, the anion and cation resins are recombined for reuse in a service vessel. The cation portion of the interfacial cut may be combined with the cation resin of the third cut and the anion portion of the interfacial cut may be combined with the anion resin of the first cut.

There is a need for an improved method and apparatus for regenerating the exhausted anion and cation exchange resins in a mixed bed demineralizer that provides superior treatment performance and greater operational flexibility. It is important that the anion and cation exchange resins are accurately isolated to eliminate cross-contamination of the resins. Accordingly, there is a need to increase the resin separation efficiencies achieved by heretofore used regeneration systems.

SUMMARY OF THE INVENTION

Generally, the present invention provides an improved method of regenerating exhausted anion and cation exchange resins wherein an interface tank is utilized to increase the volume of interface resin that can be physically isolated to insure that increased separation efficiencies are achieved. An anticipatory interface detection sample flow of cation resin is directed from an intermediate section of the separation vessel through a sample line into the interface tank simultaneously with the transfer of cation resin from the bottom of the separation vessel into a cation regeneration vessel. Upon detection of an interface by the entry of anion resin into the sample line, the transfer of cation resin into the cation regeneration tank is terminated. The remaining cation resin from the separation vessel is transferred into the interface tank through the cation transfer line until an interface, by the entry of anion resin into the cation transfer line, is detected. After the regeneration of the anion and cation resins respectively in the separation vessel and the cation regeneration vessel, the anion resin is transferred to the cation regeneration vessel and the resin in the interface tank is transferred back into the separation vessel.

More specifically, the method of the present invention provides for the transfer of the exhausted anion and cation resins from the service vessel to a separation/anion regeneration vessel which contains a quantity of inactive resin material. Following a sequence of wash, drain, and air scrub steps, the resins are backwashed from a bottom distributor to classify the resins into an upper anion resin layer and a lower cation resin layer. The cation resin layer is then transferred from the bottom of the separation/anion regeneration vessel through a cation transfer line into a cation regeneration vessel. At the same time, an anticipatory interface sample flow of cation resin from an intermediate section of the separation/anion regeneration vessel is directed through a sample line into an interface tank. Upon the detection of an interface, by the entry of anion resin into the sample line, the transfer of cation resin into the cation regeneration tank is terminated, as is the transfer of resin through the sample line. The remaining cation resin from the separation tank is transferred into the interface tank through the cation transfer line. Upon the detection of an interface by the entry of anion resin into the cation transfer line, the transfer of resin from the bottom of the separation/anion regeneration vessel into the interface tank is terminated. Upon completion of the cation resin transfer, regenerant liquid is directed through the separation/anion regeneration vessel and the cation regeneration vessel to respectively regenerate the anion resin and cation resin contained therein. After rinsing of the anion and cation resins, the anion resin is transferred to the cation regeneration vessel wherein it is air mixed with the cation resin and final rinsed, whereupon the mixed anion and cation resin is held awaiting transfer to a service vessel. The resin from the interface tank is then transferred back into the separation/anion regeneration vessel to await the next regeneration cycle.

In accordance with an alternative embodiment of the invention, the anion resin in the separation/anion regeneration vessel may be regenerated with a caustic soda of a concentration in the range of 10–18% causing the anion resin to float and any traces of cation resin to sink to the bottom of the vessel. After settling and rinsing, the anion resin is then transferred out of the vessel from a point above the bottom leaving behind the cation fines and a small quantity of anion resin.

In accordance with another alternative embodiment of the invention, the anion resin in the separation/anion regeneration vessel may be regenerated in a conventional manner with 4% caustic soda, rinsed and then subjected to a secondary backwash. During the secondary backwash, some of the large cation resin fines will settle to the bottom of the vessel. The anion resin is then transferred out of the vessel from a point above the bottom leaving behind the cation resin fines and a small quantity of anion resin.

In accordance with yet another embodiment of the invention, the separation/anion exchange vessel may contain a quantity of inert material that has a specific density intermediate the specific densities of the anion and cation resins. Upon backwashing of the resins in the separation/anion regeneration vessel, the resins are classified into an upper anion resin layer, an intermediate inert material layer and a lower cation resin layer. The transfer of the cation resin from the bottom of the separation/anion regeneration vessel to the cation regeneration vessel is terminated upon detection of an interface by the entry of the inert material into the sample line. The transfer of the remaining cation resin from the separation vessel through the cation transfer line into the interface tank is terminated upon detection of an interface by the entry of the inert material into the cation transfer line. The anion resin is regenerated in the separation/anion regeneration vessel and transferred to the cation regeneration vessel after the cation resin contained therein has been regenerated, leaving behind the inert material and any not previously transferred cation resin. The resin from the interface tank may then be transferred back into the separation/anion regeneration vessel.

DESCRIPTION OF THE DRAWING

The FIGURE is a schematic representation of a regeneration station in which a preferred embodiment of the present invention may be employed.

DESCRIPTION OF THE PREFERRED EMBODIMENTS

Figure 1:
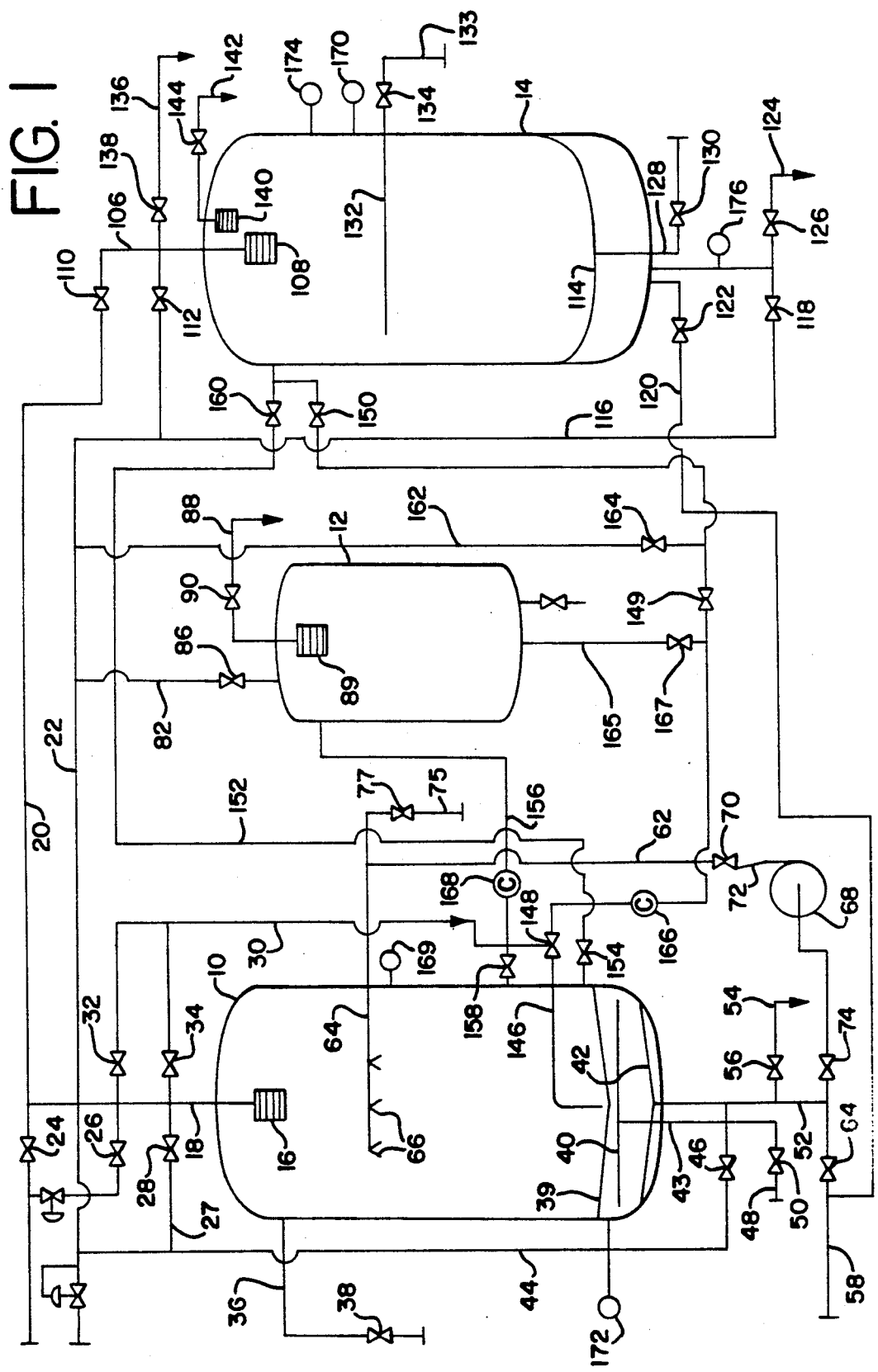

The regeneration method in accordance with the present invention is hereinbelow disclosed in conjunction with a regeneration station apparatus schematically represented in the FIGURE. It will be readily realized by one skilled in the art that the regeneration method of the present invention may be utilized with alternative regeneration station apparatus. Accordingly, the disclosure of a specific regeneration station is for exemplary purposes only, and not to indicate a limitation as to the scope of the invention.

Referring to the FIGURE, a regeneration station is disclosed which includes a separation/anion regeneration vessel 10, an interface tank 12 and a cation regeneration vessel 14. Separation/anion regeneration vessel 10 has an upper distributor and strainer assembly 16 in communication with an upper inlet/outlet line 18. Line 18 is in communication with an air supply line 20, associated with an air supply source (not shown), a regenerated water supply line 22, associated with a regenerated water supply source (not shown) and an open drain line 30. Air supply line 20 is controlled by air inlet valves 24 and 26. A rinse water supply line 27 is controlled by a rinse inlet valve 28. Drain line 30 is controlled by backwash outlet valves 32 and 34. A resin inlet line 36 enters an upper portion of vessel 10 and is controlled by a resin transfer valve 38. Vessel 10 has an underdrain system which includes a barrier 39 permitting the passage of liquid therethrough while retaining ion exchange resins thereon. Below barrier 39 is a wash water distributor 40 and regenerant and rinse water collector 42. A lower inlet line 43 connects distributor 40 to line 22 through a backwash line 44 controlled by a backwash inlet valve 46. A conveying water inlet/outlet line 48, associated with a source of conveying water (not shown), is connected to lower inlet line 43 and is controlled by a motive water inlet valve 50. A lower inlet/outlet line 52, which extends downwardly from collector 42, is connected to a drain line 54, which is controlled by a drain valve 56. An air supply line 58, associated with an air supply source (not shown), is controlled by an air inlet valve 64 and is in communication with line 52. A caustic supply line 75, associated with a caustic supply source (not shown), is in communication with distributor 64 and is controlled by chemical inlet valve 77. A regenerant recirculation line 62 is provided to recirculate caustic regenerant received from collector 42 through line 52 and back through a mid-level distributor 64 within vessel 10. Distributor 64 preferably has nozzles 66 associated therewith to increase the velocity of the recycled regenerant. Line 62 has a recycle pump 68, a chemical inlet valve 70, a non-return valve 72, and an isolation valve 74 associated therewith.

The interface tank 12 has an upper inlet line 82, which is in communication with an upper portion of tank 12. Line 82 is in communication with water supply line 22 through control valve 86. An open drain line 88 extends into tank 12 in communication with a strainer assembly 89. A control valve 90 is provided in line 88.

The cation regeneration vessel 14 has an upper inlet/outlet line 106, which is in communication with an upper distributor and strainer assembly 108. Line 106 is in communication with air supply line 20 through air inlet control valve 110 and water supply line 22 through top rinse inlet valve 112. A dish pl ate barrier 114, with suitable strainers associated therewith (not shown), is provided in vessel 14 to permit the passage of liquid therethrough while retaining ion exchange resins thereon. A backwash water supply line 116, having a bottom backwash inlet control valve 118 associated therewith, is in communication with water supply line 22 and the bottom of vessel 14. An air inlet line 120, controlled by a bottom air inlet valve 122, extends between air supply line 58 and the bottom of vessel 14. A drain line 124, controlled by a drain valve 126 associated therewith, is provided in communication with the bottom of vessel 14. A resin outlet transfer line 128 communicates with the interior of vessel 14 above barrier 114 at its lowermost point and is controlled by a resin outlet valve 130. A mid-level acid regenerant distributor 132 is provided in vessel 14 in communication with a source of acid regenerant (not shown) through acid supply line 133, which is controlled by a chemical inlet valve 134. Vessel 14 has a drain line 136, controlled by a backwash outlet valve 138, in communication with line 106. A vent and strainer assembly 140 is provided in communication with a vent line 142 through a vent valve 144.

A cation resin transfer line 146 is provided having one end in communication with the interior of vessel 10, a short distance above the lowermost point of barrier 39, and the other end in communication with an upper portion of vessel 14. The flow through transfer line 146 is controlled by resin transfer valves 148, 149 and 150. An anion transfer line 152 extends between vessels 10 and 14 and is controlled by a resin transfer valves 154 and 160. A sample line 156 extends between an intermediate section of vessel 10 and an upper section of tank 12. Sample line 156 is provided with a control valve 158. A flush line 162 extends from water supply line 22 to cation transfer line 146 between valves 149 and 150. Line 162 is provided with a control valve 164. A line 165 extends between the bottom of tank 12 and cation transfer line 146 between valves 148 and 149. Line 165 is provided with a control valve 167. Various level switches and conductivity cells are provided in the vessels and lines which will be disclosed in the discussion of the method of the present invention which hereinbelow follows.

The method of regenerating exhausted anion and cation exchange resins in accordance with the present invention will now be described in a sequence of operations using the regeneration station disclosed in the FIGURE. At the start of the regeneration cycle, vessel 10 contains a charge of inactive resin that was not transferred to the vessel 14 during the previous regeneration cycle. Vessels 12 and 14 are empty at the start of the regeneration cycle. During each of the operative steps which are hereinbelow described, it shall be assumed that all of the valves are closed except those which are specifically recited as being open. The flow control valves each permit a flow determined by the operative steps being performed.

At the start of the regeneration cycle, valves 34 and 38 are opened and the exhausted anion and cation resin is fluidized and transferred into vessel 10 through line 36. The resin bed within vessel 10 is then backwashed and classified to remove dirt particles from the bed and to classify the resin bed by opening valves 46 and 32. The backwash water flows up from barrier 39 through the resin bed and out lines 18 and 30 to drain. The water flow is continued for a sufficient time to classify the resin bed into an upper anion resin layer and a lower cation resin layer.

Upon completion of the classification of the resin within vessel 10, the cation resin is transferred from vessel 10 to the cation regeneration vessel 14. This is accomplished by opening valves 50, 148, 149, 150, 138 and 126. Motive water enters the lower end of vessel 10 through lines 48 and 43. The motive water carries the cation resin from the bottom of vessel 10 through transfer line 146 into vessel 14. At the same time, valves 158 and 90 are opened causing an anticipatory interface detection sample flow of cation resin from an intermediate section of vessel 10 through sample line 156 into vessel 12. Sample line 156 is preferably about 0.5 inches in diameter and the diameter of cation transfer line 146 is variable depending upon system size and is generally about 3.0 inches.

The transfer of cation slurry through cation transfer line 146 into vessel 14 is terminated upon the detection of an interface by the entry of anion resin into the sample line 156. The detection of the cation/anion resin interface may be accomplished in many ways well known in the art, such as by changes in conductivity and pH. In accordance with the preferred embodiment shown in the FIGURE, a conductivity cell 168 is located in sample line 156 to measure the conductivity of the slurry passing through line 156. Since the conductivity of the cation resin slurry is different from the conductivity of the anion resin, the conductivity cell 168 is used to indicate when the sample slurry being transferred changes from cation resin to anion resin. The sample line 156 is located relative to vessel 10 so that the anion resin interface enters the sample line 156 a short time before the anion resin interface enters the cation transfer line 146.

Upon detection of the anion resin interface by conductivity cell 168, valves 149 and 158 are closed and valve 167 is opened. This diverts the resin being transferred from vessel 10 through lines 146 and 165 into tank 12 and stops the flow through line 156. At the same time, valve 164 is opened to flush the cation resin downstream of valve 149 into cation regeneration vessel 14. The line flush may be terminated by a timer to close valves 150 and 164. The cation resin transfer through line 146 continues until the anion resin interface in line 146 is detected by conductivity cell 166, whereupon, Valves 148 and 167 are closed.

At this point, the vessel 10 contains anion resin and a small amount of cation heel, vessel 12 contains inactive cation resin and a small amount of inactive anion resin, and vessel 14 contains cation resin. The next series of operative steps are to get the anion resin in vessel 10 and the cation resin in vessel 14 ready for regeneration.

In vessel 10 the water level is drained down to a level just above the bed level, which is controlled by a level switch 169. This drain step is accomplished by opening valves 34 and 56. The resin bed in vessel 10 is then air scoured in a conventional manner by opening valves 64 and 34, providing air flow through line 58 into vessel 10 via collector 42 and out through line 18. Upon completion of the air scour, the bed is permitted to settle for a short period of time and backwashed by opening valves 46 and 34 to remove dirt particles from the bed. The anion bed in vessel 10 is now ready for regeneration. The cation resin bed in vessel 14 is similarly readied for regeneration. Vessel 14 is drained down to a level a short distance above bed level by opening valves 126 and 138 and drained until the level in vessel 14 reaches level switch 170. The cation resin bed is then scoured by opening valves 122 and 138 in a conventional manner. The cation resin bed is permitted to settle and it is then backwashed to remove dirt particles therefrom by opening valves 118 and 138. The cation bed in vessel 14 is now ready for regeneration.

The anion resin is regenerated in vessel 10 through the following sequence of operational steps. Vessel 10 is drained down to a level at the bottom of the bed by opening valves 26 and 56. A level switch 172 is provided to terminate the drain step. The anion resin is regenerated by introducing caustic soda (sodium hydroxide) of a concentration in the range of 10–18% through line 75 and distributor 64 into vessel 10 by opening valves 77, 56 and 34. The caustic flows through vessel 10 and out drain 56. The high density of the caustic causes the anion resin to float while any traces of cation resin (e.g., whole beads, fines or broken pieces) sink to the bottom of vessel 10, leaving a clear layer of caustic soda inbetween. In order to improve the drop out of the entrained resin, the caustic soda can be recycled externally of vessel 10 and pumped back to the caustic distributor 64. This step introduces turbulence into the floating anion resin layer. This recycle step is initiated by opening valves 70 and 74 and turning on recirculation pump 68. Following the regeneration step, the anion resin is settled and rinsed and is readied for transfer to the cation regeneration vessel 14.

The cation resin is regenerated in vessel 14 at the same time as the anion resin is being regenerated in vessel 12. The cation resin in vessel 14 is regenerated in a convention manner by passing an acid regenerant (i.e., 10% sulphuric acid) through the resin bed by opening valves 134 and 126. The regenerant acid enters vessel 14 through distributor 132 and exits through drain line 124. The regenerated cation resin in vessel 14 is rinsed in a conventional manner.

Upon completion of the regenerating and rinsing, the anion resin bed in vessel 10 is transferred to vessel 14. This is accomplished by opening valves 46 and 28 to initiate a water transfer of the anion resin bed through line 152 from a point a short distance above the bottom of barrier 39. In so doing, the settled cation fines and a small quantity of anion resin remains in vessel 10 The liquid level in vessel 14 is then partially drained down to the level of level switch 174 by opening valves 138 and 126. The resin bed in vessel 14 is air mixed in a conventional manner by opening valves 122 and 138 and starting a blower motor associated with line 58. Vessel 14 is drained down and the resin bed is then subjected to a slow refill step and a fast refill step by suitably opening valves 112 and 126. The rinse water enters through line 106 and exits through dish plate 114 and drain line 124. The final rinse step is continued until the conductivity of the rinse water passing through outlet line 124 is approximately 0.5 micromhos as measured by conductivity probe 176 in line 124. The regenerated bed of mixed cation and anion resin can be kept on stand-by in vessel 14, from where it can be transferred to a service vessel following transfer of the next exhausted charge to vessel 10. Alternatively, the resin bed can be transferred from vessel 14 to a storage vessel where it can be held until required to be transferred to a service vessel.

At such time as the anion and cation resin is being air mixed and rinsed in vessel 14, the inactive resin in vessel 12 is flushed back into vessel 10 by opening valves 148, 167 and 86.

The method of the present invention utilizes an interface resin tank to increase the volume of interface resin that can be physically isolated during the regeneration cycle. The termination of the transfer of cation resin from the separation vessel into the cation resin regeneration vessel, by detecting the interface in the sample line, eliminates cross-contamination of the cation resin.

In accordance with an alternative embodiment of the invention, the anion resin in vessel 10 may be regenerated in a conventional manner with 4% caustic soda, rinsed and then subjected to a secondary backwash. During the secondary backwash, some of the large cation resin fines will settle to the bottom of vessel 10. The anion resin is then transferred out of the vessel from a point above the bottom leaving behind the cation resin fines and a small quantity of anion resin.

In accordance with another embodiment of the invention, the vessel 10 may contain a quantity of inert material that has a specific density intermediate the specific densities of the anion and cation resins. An example of an inert resin is Ambersep Inert (R), which is manufactured by Rohm and Haas Company. Upon backwashing of the resins in vessel 10, the resins are classified into an upper anion resin layer, an intermediate inert material layer and a lower cation resin layer. The cation resin is transferred from vessel 10 to vessel 14 in the same manner as discussed hereinabove. The transfer of the cation resin is terminated upon detection of an interface by the entry of the inert material into sample line 156. The transfer of the remaining cation resin from vessel 10 through cation transfer line 146 into tank 12 is terminated upon detection of an interface by the entry of the inert material into the cation transfer line. The anion resin is regenerated and rinsed in vessel 10 and the cation resin is regenerated and rinsed in vessel 14 in the manner as discussed above. The regenerated anion resin is then transferred to vessel 14 and mixed with the regenerated cation resin contained therein, leaving behind the inert material and any not previously transferred cation resin. The material from the interface tank is then transferred back into vessel 10.

Obvious modifications of the aforementioned method will occur to those skilled in the art. It is intended by the appended claims to cover all such modifications coming within the proper scope of the invention.

What is claimed is:

1. A method for regenerating a mixture of anion and cation exchange resins from a mixed bed demineralizer, comprising the steps of:
   (a) transferring the exhausted anion and cation resins into a separation vessel having a quantity of inactive resin material therein;
   (b) directing a backwash liquid through the separation vessel so as to separate the resins into an upper anion resin layer and a lower cation resin layer;
   (c) transferring the cation resin from the bottom of the separation vessel through a cation transfer line into a cation regeneration vessel while simultaneously directing an anticipatory interface detection sample flow of cation resin from an intermediate section of the separation vessel through a sample line into an interface tank;
   (d) detecting an interface by the entry of anion resin into the sample line;
   (e) terminating the transfer of cation resin into the cation regeneration vessel and the transfer of the sample flow into the interface tank upon detection of the interface in step (d);
   (f) transferring the remaining cation resin from the bottom of the separation vessel through the cation transfer line into the interface tank;
   (g) detecting an interface by the entry of anion resin into the cation transfer line;
   (h) terminating the transfer of cation resin from the bottom of the separation vessel upon detection of the interface in step (g);
   (i) directing a regenerant liquid through the separation vessel to regenerate the anion resin;
   (j) directing a regenerant liquid through the cation regeneration vessel to regenerate the cation resin;
   (k) transferring the anion resin from the separation vessel to the cation regeneration vessel; and
   (l) transferring the resin from the interface tank back into the separation vessel.

2. The method as defined in claim 1 further including the step of rinsing the anion resin in the separation vessel prior to transfer of the anion resin to the cation regeneration vessel.

3. The method as defined in claim 1 further including the step of rinsing the cation resin in the cation regeneration vessel after the regeneration of the cation resin.

4. The method as defined in claim 1 wherein the regenerant liquid passing through the separation vessel is a sodium hydroxide solution in the range of about 10–18 percent concentration which causes the anion resin to float and any not previously transferred cation resin to sink and a layer of sodium hydroxide regenerant inbetween.

5. The method as defined in claim 2 further including the step of backwashing the anion resin in the separation vessel to settle out cation fines to the bottom of the separation vessel prior to transfer of the anion resin to the cation regeneration vessel so that the settled cation fines remain in the separation vessel.

6. The method as defined in claim 1 further including the step of flushing resin from the cation transfer line into the cation regeneration vessel.

7. The method as defined in claim 1 wherein the entry of the interface of anion resin into the sample line is determined by detecting a change in conductivity of the sample line slurry.

8. The method as defined in claim 1 wherein the entry of the interface of anion resin into the cation transfer line is determined by detecting a change in conductivity of the cation transfer line slurry.

9. A method for regenerating a mixture of anion and cation exchange resins from a mixed bed demineralizer, comprising the steps of:
   (a) transferring the exhausted anion and cation resins into a separation vessel having a quantity of inactive resin material and a quantity of inert material having a specific density intermediate the specific density of the anion and cation resins therein;
   (b) directing a backwash liquid through the separation vessel so as to separate the resins into an upper anion resin layer, an intermediate inert material layer and a lower cation resin layer;
   (c) transferring the cation resin from the bottom of the separation vessel through a cation transfer line into a cation regeneration vessel while simultaneously directing an anticipatory interface detection sample flow of cation resin from an intermediate section of the separation vessel through a sample line into an interface tank;
   (d) detecting an interface by the entry of the inert material into the sample line;
   (e) terminating the transfer of cation resin into the cation regeneration vessel and the direction of the sample flow into the interface tank upon detection of the interface in step (d);
   (f) transferring the remaining cation resin from the bottom of the separation vessel through the cation transfer line into the interface tank;
   (g) detecting an interface by the entry of
   (h) terminating the transfer of cation resin from the bottom of the separation vessel upon detection of the interface in step (g);
   (i) directing a regenerant liquid through the separation vessel to regenerate the anion resin;
   (j) directing a regenerant liquid through the cation regeneration vessel to regenerate the cation resin;
   (k) transfer ring the anion resin from the separation vessel to the cation regeneration vessel leaving the inert material and any not previously transferred cation resin in the separation vessel; and
   (l) transferring the resin from the interface tank back into the separation vessel.

10. The method as defined in claim 9 wherein the regenerant liquid directed into the separation vessel causes the anion resin to float, the inert material and any not previously transferred cation resin to sink and a layer of regenerant inbetween.

11. The method as defined in claim 9 further including the step of flushing resin from the cation transfer line into the cation regeneration vessel.

12. The method as defined in claim 9 wherein the entry of the interface of inert material into the sample line is determined by detecting a change in conductivity of the sample line slurry.

13. The method as defined in claim 9 wherein the entry of the interface of inert material into the cation transfer is determined by detecting a change in conductivity of the cation transfer line slurry.

* * * * *